United States Patent [19]

Richards et al.

[11] Patent Number: 4,735,109
[45] Date of Patent: Apr. 5, 1988

[54] SEMI-BLOCKED TRANSMISSION

[75] Inventors: Elmer A. Richards, Kalamazoo; Russell C. Holmes, Troy, both of Mich.

[73] Assignee: Eaton Corporation, Cleveland, Ohio

[21] Appl. No.: 77,063

[22] Filed: Jul. 22, 1987

Related U.S. Application Data

[63] Continuation of Ser. No. 287,470, Jul. 21, 1981, abandoned.

[51] Int. Cl.$^4$ ............................ F16H 3/02; F16H 3/38
[52] U.S. Cl. ......................................... 74/745; 74/339; 74/331
[58] Field of Search ................ 74/331, 333, 339, 363, 74/372, 745

[56] References Cited

U.S. PATENT DOCUMENTS

| | | | |
|---|---|---|---|
| 2,932,988 | 4/1960 | Flynn et al. | 74/745 |
| 3,105,395 | 10/1963 | Perkins | 74/745 |
| 3,229,551 | 1/1966 | Stuckey | 74/745 |
| 3,237,472 | 3/1966 | Perkins et al. | 74/331 |
| 3,265,173 | 8/1966 | Russell | 74/710.5 |
| 3,283,613 | 11/1966 | Perkins | 74/331 |
| 3,335,616 | 8/1967 | Perkins | 74/396 |
| 3,611,823 | 10/1971 | Richards et al. | 74/331 |
| 3,648,546 | 3/1972 | McNamara et al. | 74/745 |
| 3,799,002 | 3/1974 | Richards | 74/745 |
| 3,910,131 | 10/1975 | Richards | 74/339 |
| 3,921,469 | 11/1975 | Richards | 74/339 |
| 3,924,484 | 12/1975 | Richards | 74/331 |
| 3,983,979 | 10/1976 | Richards | 192/53 F |
| 4,104,928 | 8/1978 | Vandervoort | 74/331 |
| 4,132,122 | 1/1979 | Richards | 74/339 |
| 4,141,440 | 2/1979 | Richards | 74/339 |
| 4,152,949 | 5/1979 | Vandervoort et al. | 74/331 |
| 4,176,736 | 12/1979 | Richards et al. | 74/339 |
| 4,192,196 | 3/1980 | Bogema et al. | 74/339 |
| 4,194,410 | 3/1980 | Richards | 74/339 |
| 4,269,077 | 5/1981 | Vandervoort | 74/331 |
| 4,375,172 | 3/1983 | Richards et al. | 74/339 |

Primary Examiner—Dirk Wright
Attorney, Agent, or Firm—D. A. Rowe; H. D. Gordon

[57] ABSTRACT

A compound change gear semi-blocked transmission (10) of the splitter type is provided. The transmission comprises a multi-speed main section (12) connected in series with an multi-speed auxiliary section (14). The main section utilizes manually engaged, non-blocked, nonsynchronized jaw clutch assemblies (56, 58, 60) while the auxiliary section utilizes resiliently shifted blocked jaw clutch assemblies (114, 116, 118, 120). The blocked jaw clutch assemblies are provided with ramps (176, 178, 180, 182) which will cause unblocking during a clutching operation if the main section is not engaged.

7 Claims, 4 Drawing Sheets

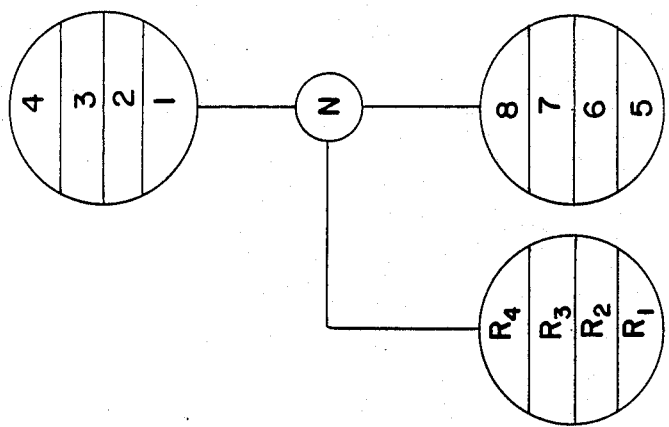
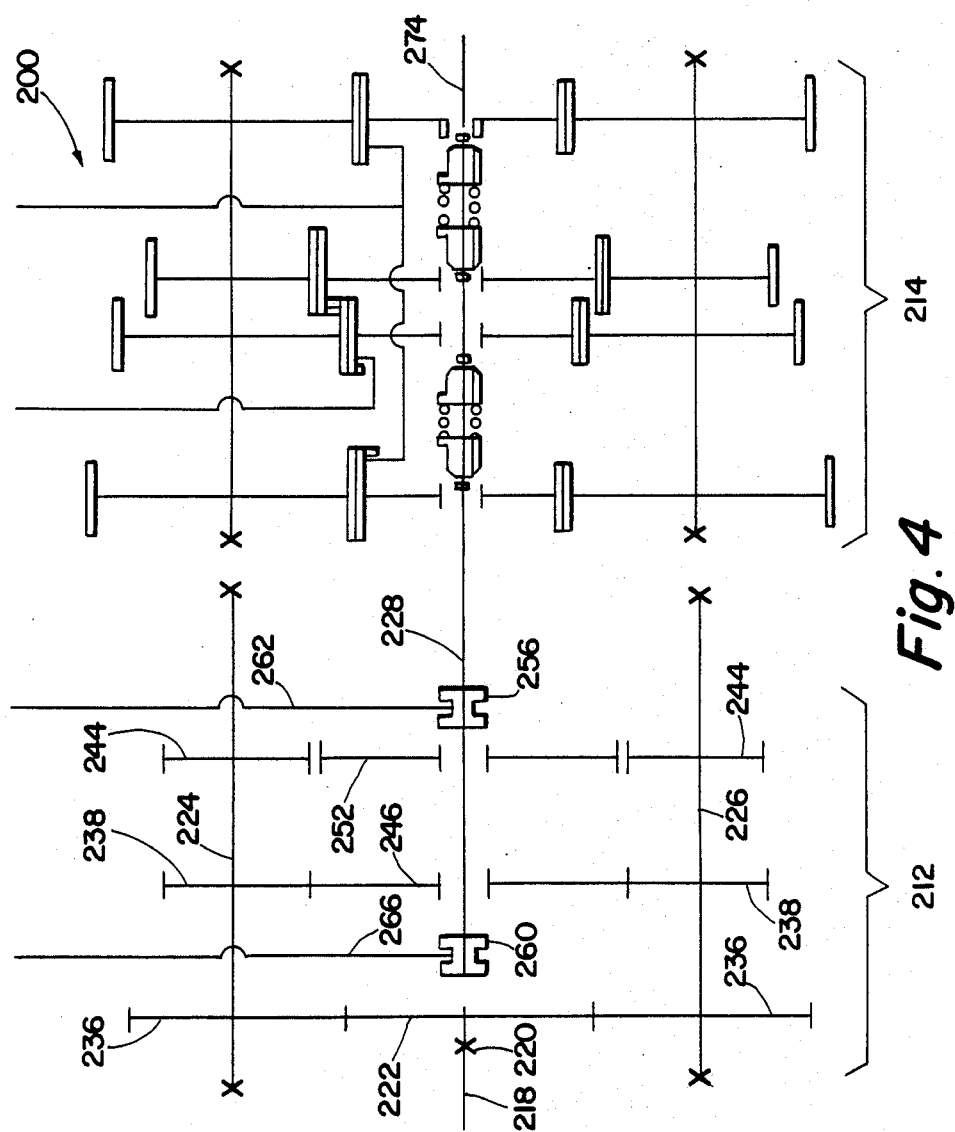
Fig. 5
Fig. 4

SEMI-BLOCKED TRANSMISSION

This application is a continuation of application Ser. No. 287,470, filed July 27, 1981, abandoned.

BACKGROUND OF THE INVENTION

1. Field of the Invention

This invention relates to compound change gear transmissions of the type comprising a multispeed main transmission section connected in series with a multispeed auxiliary transmission section and in particular to compound change gear transmissions wherein the main section utilizes manually engaged nonsynchronized, unblocked jaw clutches to selectively engage a selected main section ratio gear and wherein the auxiliary section utilizes blocked resiliently shifted jaw clutches to selectively engage a selected auxiliary ratio. Preferably, the blockers and associated clutch members in the auxiliary section have complementary ramps on the blocking members thereof configured to prevent nonsynchronized engagement of the associated jaw clutch members when the main section is engaged but which will tend to act as positioners to place the blocker and clutch member in a nonblocking condition when the main section is in a neutral or disengaged condition.

2. Description of the Prior Art

Compound transmissions of the splitter or range type or a combination thereof, are well known in the prior art as may be seen by reference to U.S. Pat. Nos. 3,105,395; 3,648,546; 3,799,002; 2,932,988 and 3,229,551, all hereby incorporated by reference.

Blocked change gear transmissions of both the single and the compound types are also well known in the prior art as may be seen by reference to U.S. Pat. Nos. 3,799,002; 3,921,469; 3,924,484; 3,983,979; 4,192,196 and 4,194,410, all of which are hereby incorporated by reference.

In the design of transmissions, particularly heavy duty transmissions, such as used in trucks, there has existed for a long time the problem of shifting the transmission to the various speed ratios, which problem is even greater when the transmission is compounded, that is provided with an auxiliary transmission section of the range or the splitter type for increasing the number of speed ratios. In most known transmissions, the shifting process is either relatively difficult and/or the shifting mechanism is relatively complex. Thus, there has been a continuing effort in the design of transmissions to improve the shifting, to improve the rapidity of shifting, to reduce the complexity of the shifting mechanism, and to reduce its weight, space requirements and costs. Hence, without detracting in any way from the operability or desirability of many of the shifting mechanisms previously known, it may be stated that in the present invention these general objectives are accomplished to even a greater degrees than has been previously possible.

Particularly, most previously known transmissions have required a relatively high level of operator skill or necessarily utilized synchronizers, of which many different types are known, for causing the speed of the jaw or tooth clutch members to be substantially synchronized prior to permitting their interengagement during a shifting sequence from one speed ratio to another speed ratio. While the use of synchronizers does permit the shifting operation to be performed, their use, as is already known, imposes certain requirements of weight, space and power which is desirable to ease, or avoid entirely, if possible. This problem has been minimized, but not eliminated, in known compound transmissions wherein only the auxiliary section is provided with synchronizing means.

Blockers of the type described and illustrated in the above mentioned U.S. Pat. Nos. 3,799,002; 3,910,131; 3,921,469 and 3,983,979 are generally nondeformable devices designed to prevent, or block, the engagement of the axially engageable jaw clutch members of a jaw clutch when said members are rotating at substantially different speeds, i.e. are not substantially synchronized. Transmissions utilizing such blockers are referred to herein as "blocked transmissions". Blocked transmissions are transmissions utilizing blockers to prevent jaw clutch engagement if the members of the jaw clutch are not substantially synchronized. This is in contrast to "synchronized transmissions" which utilize synchronizer clutches to cause the jaw clutch members to be synchronized. The relatively nondeformable blockers utilized with many of blocked transmissions of the prior art are generally retained on one clutch member for rotatin therewith with a limited amount of relative rotation (3°–15°) provided. The blocker and the one clutch member will define an array of projections or the like which will allow the one clutch member to move relatively axially toward the other clutch member when in alignment but will block such relative axial movement when said blocker is rotated in either the clockwise or counterclockwise direction relative to the one clutch member. The blocker is designed to be in positive frictional contact with the second clutch member during an engaging operation and will thus tend to rotate with the second clutch member. Random frictional contact will usually cause the blockers to rotate with the second clutch members at times when a clutch engagement is not attempted.

By way of example, assuming the use of a relatively nondeformable blocker as disclosed in the above mentioned prior art and that the clutch members are rotating in a clockwise direction, if the first clutch member is rotating faster than the second clutch member, upon initiation of an engaging operation the blocker will be rotated counterclockwise relative to the first clutch member and the blocker will prevent axial movement of the first clutch member towards the second clutch member. If the second clutch member is rotating faster than the first clutch member, the blocker will be rotated clockwise relative to the first clutch member and the blocker will prevent axial movement of the first clutch member towards the second clutch member. If the first clutch member initially rotates faster, then slower than the second clutch member, the blocker would, relative to the first clutch member, rotate in a clockwise direction from an initial counterclockwise rotated position relative to the first clutch member towards a relatively clockwise rotated position. During the relative rotation, for at least a limited period of time, the blocker would align with the first clutch member and cease to block axial movement thereof towards the second clutch member. Such movement of the clutch members and the blocker is generally referred to as a "passing through synchronous" or "crossing synchronous" as the two clutch members reach a substantially synchronous rotation, and the clutch engaging operation, or the gear shift, should be completed at this time. As the blocker is designed to be in positive frictional contact with the second clutch member only during a clutch engaging operation to prevent undue frictional wear, it is possible, under certain conditions, that the blocker can be set up on the "wrong side of synchronous" at the initiation of a clutch engaging operation, i.e. referring to the above example, rotated clockwise relative to the first clutch member when the first clutch member is rotating faster that the second clutch member or vice versa. Under such conditions, especially if the driven device is stopped, it is often difficult or impossible to cause the blocker to "pass through synchronous" and the transmission cannot, without undue manipulation, be shifted into the desired gear ratio.

In a blocked transmission, the blocker clutch members have an inherent problem of achieving engagement under certain static conditions, i.e., when the driven device is standing still. When a blocked transmission of the twin countershaft type as is illustrated in U.S. Pat. No. 3,799,002 or 3,924,484 is in neutral with the master clutch engaged, the gearing will, for at least a period of time, rotate while the output or main shaft is stationary. This tends to place the blockers in the "upshift position", i.e., that position associated with a dynamic upshift wherein the jaw clutch member rotating with the mainshaft must be rotated faster than the clutch member rotating with the gearing to cause the clutch to pass through synchronous. When the gearing comes to a stop, the blockers remain in the "upshift position" and, because it is difficult to rotate the mainshaft with the transmission in neutral, a reversing of the gearing or an auxiliary aligning of the blockers is required to achieve a clutch engagement.

In a compound, blocked transmission of the type seen in U.S. Pat. Nos. 3,799,002 and/or 3,924,484 relative overspeeding of the auxiliary transmission gearing by the mainshaft can be achieved by the operator momentarily shifting the transmission from neutral into reverse. This method is possible as reverse is normally not a blocked gear. But this is obviously an inconvenience, a highly undesirable technique, and might hamper the commerical acceptability of an otherwise highly successful transmission.

Various types of self-aligning blockers, when utilized with an input shaft brake, are an effective auxiliary method of obtaining clutch engagement at a static condition. However, due to manufacturing, space, cost and operational considerations, an improved means for achieving status clutch engagement is desirable.

One attempt to minimize the problems of a fully blocked transmission involves the use of a selectively actuated mechanism to decelerate and/or reverse rotate the input gearing as may be seen by reference to U.S. Pat. No. 4,194,410. Although such devices have proven to be functionally acceptable, they do add additional cost and weight to a transmission utilizing same.

SUMMARY OF THE INVENTION

In accordance with the present invention, the drawbacks of the prior art have been overcome or minimized by the provision of a compound transmission which is easier to shift than many heretofor available transmissions, yet is less costly and complicated than heretofor available synchronized and/or fully blocked transmissions.

The above is accomplished by providing a compound transmission, preferably of the splitter type, wherein the main transmission section is provided with well known nonsynchronized, unblocked jaw clutch assemblies, the auxiliary transmission section is provided with resiliently shiftable blocked jaw clutch assemblies, and, preferably, the blocked jaw clutch assemblies are provided with complimentary ramp members on the associated blocker and clutch members which will cause the blockers to prevent nonsynchronous engagement of the associated jaw clutch assemblies when the main transmission section is engaged but will allow the blocker to tend to rotationally move to a nonblocking position under the influence of a spring bias, when the main transmission section is in neutral. The above structure provides a relatively uncomplicated and reliable compound transmission which is shiftable with substantially the ease of a simple transmission and allows shifts to be completed with the vehicle in a static condition.

Accordingly, it is an object of the present invention to provide a new and improved semi-blocked compound change gear transmission of the type having an input shaft driven by a one-way prime mover through a normally engaged, selectively disengaged master friction clutch.

A further object of the present invention is to provide a semi-blocked compound transmission having structure simplifying gear engagements at static conditions.

These and other objects and advantages of the present invention will become apparent from a reading of the detailed description of the preferred embodiment taken in view of the accompanying drawings.

DESCRIPTION OF THE DRAWINGS

FIG. 4 is a schematic illustration of an eight speed version of semi-blocked transmission of the present invention.

FIG. 5 is a schematic illustration of the shift pattern of the transmission of FIG. 4.

DESCRIPTION OF THE PREFERRED EMBODIMENT

Referring now to the apparatus in detail, it will be recognized that a detailed disclosure of both the construction and operation of blockers and blocked transmissions utilizing same has been set forth and claimed in the above mentioned patents and reference is therefore made thereto for such details.

Figure 1:
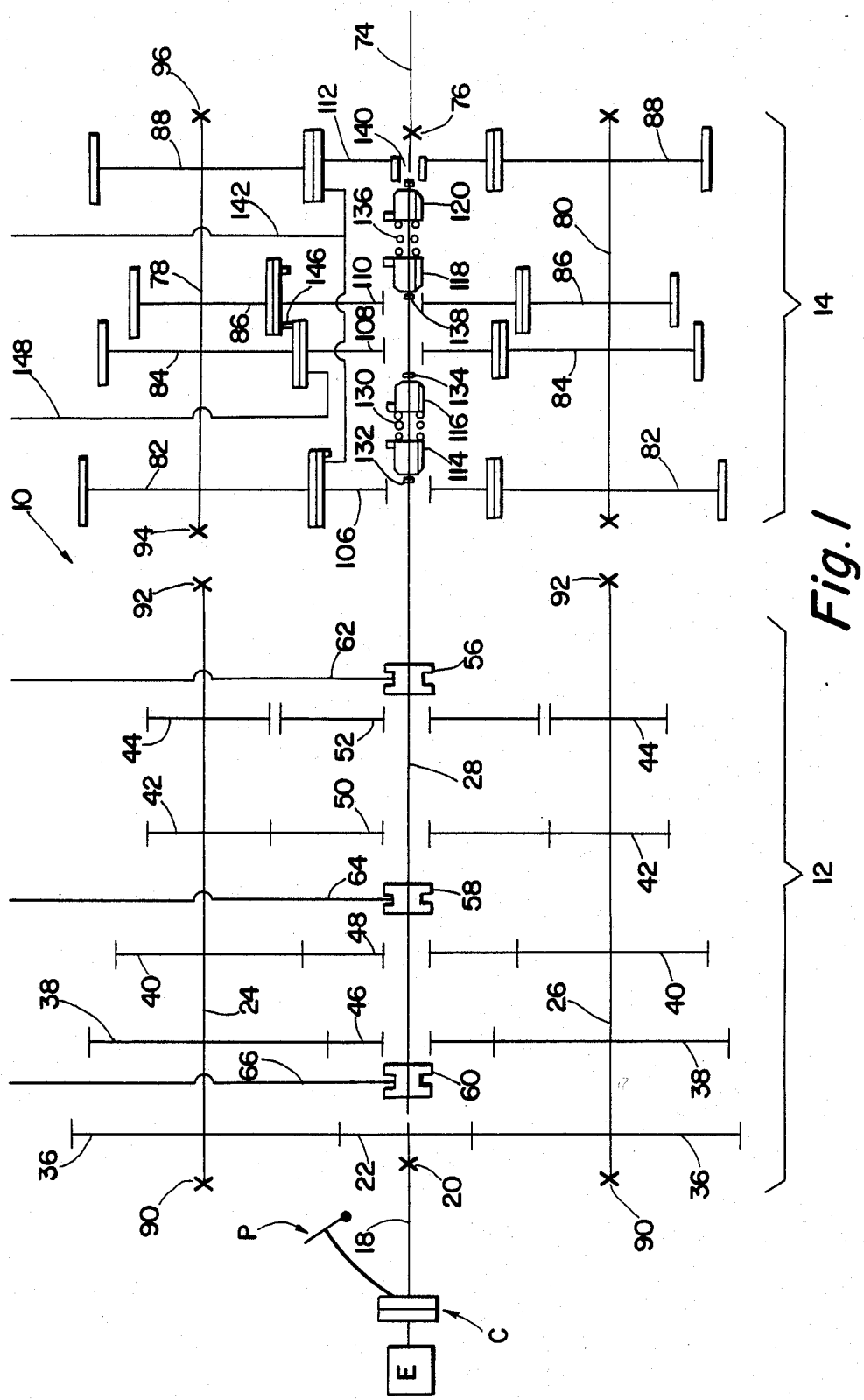
FIG. 1 is a schematic illustration of a sixteen speed version of semi-blocked transmission of the present invention.

Certain terminology will be used in the following description for convenience in reference only and will not be limiting. The words "upwardly", "downwardly", "rightwardly" and "leftwardly" will designate directions in the drawings to which reference is made. The words "forward" and "rearward" will refer respectively to the front and rear ends of the transmission as same is conventionally mounted in the vehicle, being respectively the left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "simple transmission" is used to designate a change speed transmission wherein the operator may select one of a plurality of single gear reductions. The term "compound transmission", is used to designate a transmission having a main transmission portion and an auxiliary transmission portion connected in series whereby the selected gear reduction in the main transmission portion may be compounded by further selected gear reduction in the auxiliary transmission portion. The term "splitter type compound transmission" as used herein will designate a compound transmission wherein the auxiliary transmission is used to provide various selectable steps or subdivisions of the gear ratio selected in the main transmission portion. In a splitter type compound transmission, the main transmission section is typically provided with relatively wide steps which are split or subdivided by the auxiliary section. The term "upshift" as used herein shall mean the shifting from a lower speed gear ratio to a higher speed gear ratio. The term "downwardly" as used herein shall mean the shifting from a higher speed gear ratio to a lower speed gear ratio. The terms "low speed gear", "low gear" and/or "first gear" as used herein shall all designate the gear ratio utilized for lowest forward speed operation in a transmission, i.e., that set for gears having the highest ratio of reduction relative to the input shaft of the transmission.

The term "blocked transmission" or "blocked transmission section" shall designate a change gear transmission or transmission section wherein a selected gear is nonrotatably coupled to a shaft by means of a positive clutch and a blocker is utilized to prevent such engagement until the members of the positive clutch are substantially synchronous, such synchronous condition achieved by manual and/or automatic manipulation of the transmission input and/or output shafts to cause a crossing of synchronous condition therebetween but not achieved by frictional contact of the selected clutch members sufficient to cause one of the clutch members, and the apparatus associated therewith, to rotate with the other clutch member.

The term "synchronized transmission" shall designate a change gear transmission wherein a selected gear is non-rotatably coupled to a shaft by means of a positive clutch, attempted engagement of said clutch is prevented until the members of the clutch are synchronous and frictional means associated with the clutch members are sufficient, upon initiation of a clutch engagement, to cause the clutch members, and all members rotating therewith, to rotate at a substantially synchronous speed of rotation.

Insofar as concerns the integration of the relatively nondeformable blockers into the shiftable change speed auxiliary transmission system of the present invention, the blockers are placed between the two relatively axially slidable portions, or members, of at least one and preferably most or all of the auxiliary transmission section positive clutches and the usual friction means are provided for causing the blockers to tend to rotate with one of said members as the clutch members respectively move toward each other during a clutching procedure. One of such clutch members is often formed integrally with a mainshaft gear as internal clutch teeth thereof. As the clutching procedure occurs, the blocker limits such relative axial movement until substantial synchronization between the clutch members involved in a given shift is sensed.

The blockers of the present invention, and the other clutch elements of a given clutchable pair of clutch members, are typically provided with complementary angling leading spaces or ramps on the blocker teeth or members thereof to tend to, under the influence of the spring bias, cause an unblocking when the mainshaft is otherwise unconnected to any other mainshaft gears and hence at a minimum inertia. The angling of said blocker teeth is, however, insufficient to effect unblocking during a normal shift and hence will not interfere with the required blocking fuunction thereof during a normal shift. It has been found that complementary ramp angles of about 15°–25°, preferably about 20°, provide satisfactory operation when used in connection with normally encountered spring forces and clutch inertias. As may be seen by reference to U.S. Pat. Nos. 3,921,469 and 3,924,484, both above mentioned, there may further be provided means by which a significant axial drag with a minimum of rotational draft is provided constantly between the blocker ring and the clutch member blocked thereby. Thus, said blocker rings will be axially urged upon axial movement of said last named clutch element into engagement with the driving cone of the other clutch element and will thereby be held in proper position against the effect of its own inertia with respect to the gear associated therewith. This assures that, in most operating situations, the blocker rings will be in the desired position prior to contact with the blocking surface of the clutch.

The illustrated blocker elements also contain advantageous features in that there is required removal of only one portion of one tooth of a clutch member and the blocker ring is provided with a pair of teeth or projections extending toward the clutch element from which a part of said one tooth has been removed. Said teeth are of sufficient circumferential spacing to straddle the remaining portion of said one tooth when synchronization is achieved for effecting an unblocking condition but at least one of said blocker teeth are themselves of circumferential dimension less than the spacing between the teeth on said clutch element for permitting circumferential shifting thereof in at least one direction and the creation of a blocking condition.

Compound transmission, especially of the splitter type, are usually designated by an "A×B" notation wherein:

A=the number of selectable forward speeds or power paths in the main transmission section;

B=the number of selectable speeds or power paths in the auxiliary transmission section; and A×B=the total number of available forward transmission speeds.

Accordingly, a twelve speed splitter type compound transmission could be a "6×2", a "4×3", a "3×4" or a "2×6". Due to the difficulty in shifting the auxiliary transmission section in many of the prior art transmissions, it has been conventional practice to provide compound transmissions wherein A was equal to or greater than B.

While the present invention is applicable to all types of splitter type compound transmissions, it allows the use and relatively easy shifting of compound splitter type transmissions wherein A is less than B which provides substantial benefits as will be discussed in greater detail below. As will be discussed below, such transmissions require less shift lever manipulation, provide a greater number of reverse speed ratios, require less manual synchronizing of the main transmission section and less master clutch manipulation, especially for over the highway operation.

Figure 2:
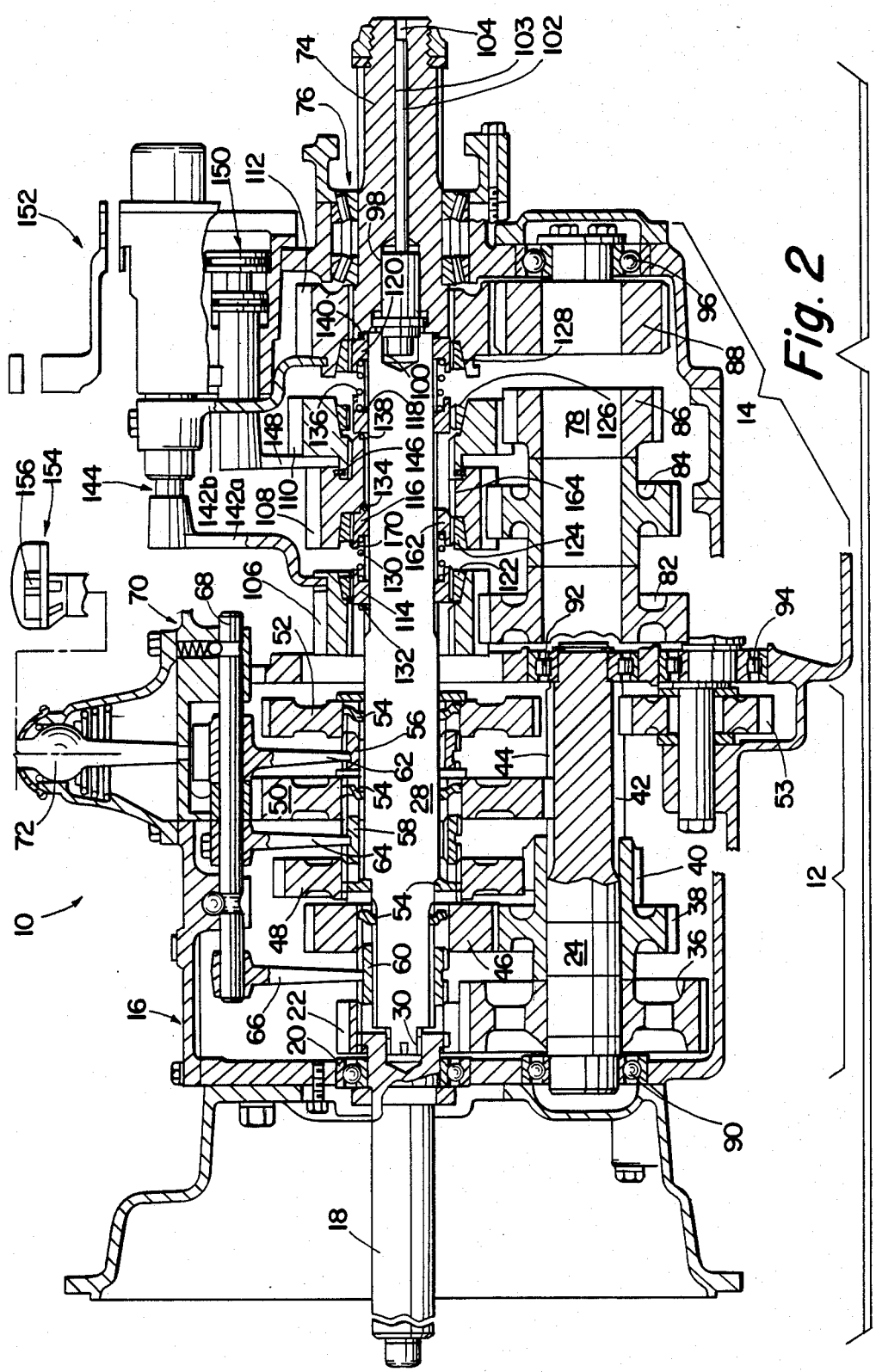
FIG. 2 is partial sectional view of the transmission of FIG. 1.
Figure 3:
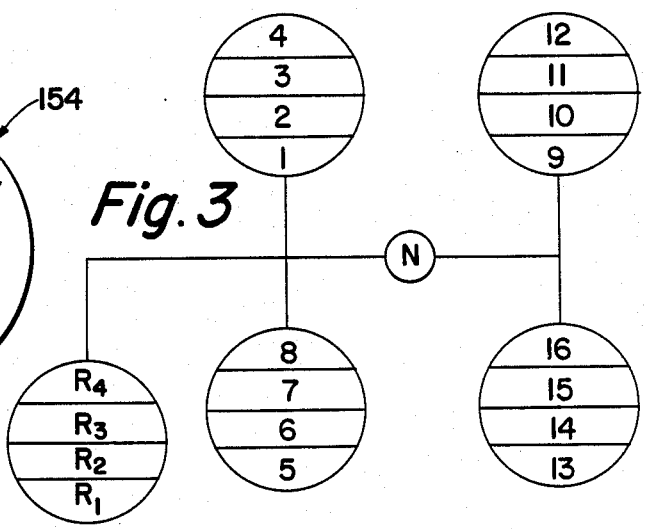
FIG. 3 is a schematic illustration of the shift pattern of the transmission of FIG. 1.

Referring now to FIGS. 1-3, there is illustrated a "4×4", sixteen forward speed, semi-blocked, splitter type, compound transmission 10. Transmission 10 comprises a main section 12 connected in series with an auxiliary section 14, each of which have a plurality of selectable speeds, or power paths. The main and auxiliary sections are both suitably enclosed by conventional housing means 16.

The transmission 10 includes an input shaft 18 supported adjacent its rearward end by a bearing 20 and is provided with an input gear 22 nonrotatably connected thereto, as by splines. The input gear 22 simultaneously drives a plurality of main section countershafts at equal speeds. In the illustrated embodiment, the transmission is provided with two main section countershafts, 24 and 26, disposed on diametrically opposite sides of the mainshaft 28, which mainshaft is coaxially aligned with the input shaft 18 and is provided with a pilot portion 30 on its forward end rotatably received within and supported by the rearward end of the input shaft 18.

The input shaft 18 is normally driven in one direction only by a primemover, such as a throttle controlled Diesel engine E through a selectively operated; normally engaged, friction master clutch C. Clutch C may be selectively disengaged by use of pedal P as is known in the prior art. Clutch C may have a known clutch-brake associated therewith.

Each of the main section countershafts 24 and 26 is provided with an identical grouping of countershaft gears, 36, 38, 40, 42 and 44 thereon, which groupings form pairs of gears, such as the pair of gears 36, of identical size and number of teeth and disposed on diametrically opposite sides of the mainshaft 28. As may be seen by reference to FIG. 2, countershaft gears 42 and 44 may be defined by involute splines formed directly on the main section countershafts.

A plurality of main section mainshaft drive gears 46, 48, 50 and 52 surround the mainshaft 28 and are selectable clutchable thereto, one at a time, by sliding clutch collars as is well known in the art.

The main section mainshaft gears 46, 48 and 50 encircle the mainshaft 28, are in continuous meshing engagement with, and are floatingly supported by the diametrically opposite pairs of countershaft gears, 38, 40 and 42, respectively, which mounting means and the special advantages resulting therefrom are explain in greater detail in U.S. Pat. Nos. 3,105,395 and 3,335,616, both assigned to the assignee of this application and hereby incorporated by reference. The mainshaft gear 52 is the reverse gear and is in continuous meshing engagement with a pair of countershaft gears 44 by means of conventional intermediate idler gears 53. The forwardmost countershaft gears 36 are continually meshed with and driven by the input gear 22 for causing simultaneous rotation of the countershafts 24 and 26 whenever the input shaft is rotatably driven.

Main section mainshaft gears 46, 48 50 and 52, and main section countershaft gears 36, 38, 40, 42 and 44, and the idler gears, are all constantly meshed with and driven by the input gear 22 and thus, in combination, form the input gearing of the transmission 10.

As may be seen, various abutment rings 54 are provided to axially fix the main section mainshaft gears relative to mainshaft 28.

Sliding clutch collars 56, 58 and 60 are splined to mainshaft 28 for axial movement relative thereto and rotation therewith as is well known in the art.

Sliding clutch 56 is axially slidable by means of shift fork 62 to clutch gear 52 to the mainshaft. Sliding clutch 58 is axially slidable by means of shift fork 64 to clutch either gear 50 or 48 to the mainshaft. Sliding clutch 60 is axially slidable by means of shift fork 66 to clutch gear 46 to the mainshaft or to clutch the input gear 22 (and thus the input shaft 18) to the mainshaft. Shift forks 62, 64 and 66 are attached to shift bars, or rails, (only one, 68, of which is shown) of a known shift bar housing assembly 70 which is operated by a conventional shift lever 72. The present invention is also applicable to transmissions utilizing a remote mechanical, electrical or fluid shift mechanism in place of shift bar housing 70 and shift lever 72.

Considering now the splitter auxiliary section 14, the mainshaft 28 extends thereinto and is coaxially arranged with and piloted into an output shaft 74 which is in turn supported within the housing 16 by suitable bearings generally indicated at 76. Said auxiliary section further includes a plurality of auxiliary section countershafts 78 and 80 each having an identical grouping of countershaft gears 82, 84, 86 and 88 therein.

As is known in the art and is illustrated in above-mentioned U.S. Pat. No. 3,105,395, to minimize the axial and transverse dimensions of a twin countershaft type compound transmission, the mainshaft section countershafts, 24 and 26, are displaced about 90° from the auxiliary section countershafts. Main section countershafts are supported in housing 16 by bearings 90 and 92 while auxiliary section countershafts, 78 and 80, are supported in housing 16 by bearings 94 and 96. Pilot member 98, which is received in a cavity 100 and supports the rear section of the mainshaft 28 is acted upon by a push rod 102 slidably received in a bore 103 in the output shaft 74 and acted upon by set screw 104 to properly axially position the mainshaft 28.

Three auxiliary section mainshaft gears, 106, 108 and 110 encircle the mainshaft 28 and are constanly meshed with and floatingly supported by the auxiliary countershaft gear pairs 82, 84 and 86, respectively. Output gear 112 is splined to output shaft 74 for axial movement relative thereto and rotational movement therewith. Output gear 112 is constantly meshed with auxiliary countershaft gear pair 88.

Resiliently biased clutch members 114, 116, 118 and 120 are splined to mainshaft 28 and, in combination with blockers (shown in FIG. 2 only) 122, 124, 126, 128, respectively, provide resilient, blocked clutching apparatus of the type described in U.S. Pat. Nos. 3,799,002, 3,921,469 and 3,924,484 for selectively clutching gears 106, 108, 110 and 112, respectively, one at a time, to mainshaft 28. Clutches 114 and 116 are biased axially by spring 130 and limited in their axial movements by positive steps 132 and 134. Clutch members 18 and 120 are biased axially apart by spring 136 surrounding the mainshaft and limited in axial movement by stops 138 and 140.

Gears 106 and 112 are joined for joint axial movement by shift fork 142 which may comprise two portions, 142a and 142b, movable by shift cylinder assembly 144. Mainshaft gears 108 and 110 are joined for joint axial movement and independent rotation by ring 146 and are axially movable by shift fork 148 movable by shift cylinder assembly 150. Shift cylinder assemblies 144 and 150 define a remote servo mechanism 152 by which gears 106, 108, 110 or 112 are selectively engaged, one at a time, to mainshaft 28. Of course, engagement of gear 112 to the mainshaft 28 is effective to couple mainshaft 28 directly to the output shaft 74.

Figure 10:
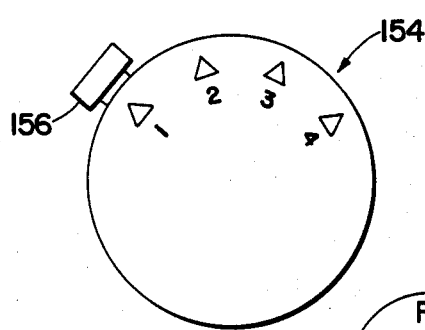
FIG. 10 a top view of the shift lever knob and master control of the transmissions of FIGS. 1 and 4.

Control of servo mechanism 152 is by a control means, such as selector knob 154 (see FIG. 10) attached to the gear shift lever 72. Typically, master control selector knob 154 will include a movable member, such as button 156, or toggle lever, having four unique positions ("1", "2", "3" and "4") by which any one of the auxiliary section power path, or speeds, may be selected. Typically, the auxiliary section master control 154, and the servo mechanism 152, is fluid and/or electrically operated and suitable master-slave valving and/or circuitry is provided.

The details of a typical blocked, resiliently biased clutch-blocker assembly may by seen by reference to FIGS. 6–9.

The yieldable clutch structures are arranged between the shiftable mainshaft gears in the auxiliary section and are provided with resilient means for urging engagement thereof as set forth in detail in the above mentioned U.S. Pat. Nos. 3,799,002 and 3,983,979. While clutch means utilizing relatively nondeformable blockers of the prior art are not identical with each other, they are generally similar and hence insofar as the present invention is concerned, it will be sufficient to described only one of them in detail with the understanding that same may be applied to the other clutch units without difficulty by anyone skilled in the art. Therefore, for this purpose, referring to the positive jaw clutch unit positioned between the mainshaft gear 108 and the mainshaft 28 in the auxiliary transmission section 14, said jaw clutch unit is generally designated 156 and includes an annular clutch collar or clutch member 116 encirclng the mainshaft 28. The clutch collar 116 is provided with internal splines 158 which are disposed within corresponding external splines 160 provided on the mainshaft 28 for interconnecting the clutch collar 116 to the mainshaft 28 for rotation therebetween. However, the cooperating splines 158 and 160 permit the clutch collar 116 to freely slide axially relative to the shaft 28. A stop ring 134 is seated within a suitable groove formed on the external periphery of the shaft 28 and is disposed for contacting the clutch collar 116 and limiting the rightward axial movement thereof. The collar 116 is normally resiliently urged by means of a spring 130 into a butting engagement with the stop ring 134.

The clutch collar 116 is provided with external teeth 162 thereon which are adapted to meshingly engage the internal teeth 164 provided on one of the mainshaft gears, such as gear 108, the internal teeth 164 form the other member of clutch 156. The teeth 162 on the clutch collar 116 are tapered, as at 166 and in a similar manner the leading edge of the teeth 164 on the mainshaft gear 108 are similarly tapered at 168. The tapered conical surfaces each extend at an angle of preferably between 30° and 40° relative to the longitudinal axis of the mainshaft 28. The exact degree of taper, and the advantages, thereof, are explained in detail in U.S. Pat. No. 3,265,173. The other end of the spring 130 resiliently acts against a further clutch collar 114 (FIG. 1) which collar is substantially identical to the collar 116 but is disposed so that it has the tapered leading ends of teeth facin in the opposite direction.

Figure 6:
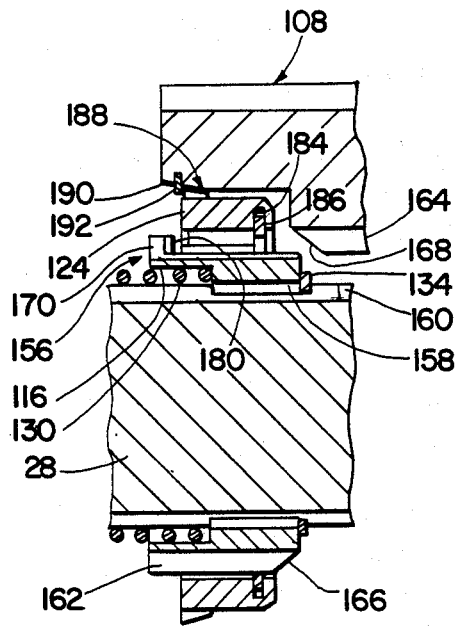
FIG. 6 is an enlarged fragmentary view, in section, of one of the jaw clutch-blocker assemblies utilized in the auxiliary splitter section of the transmissions of FIGS. 1 and 4.
Figure 7:
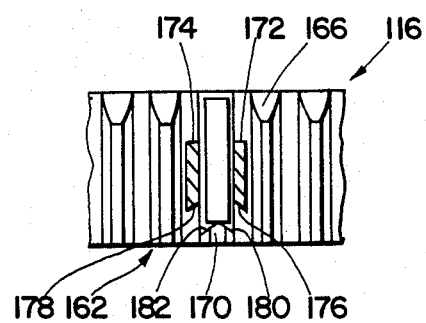
FIG. 7 is the components of the blocker and jaw clutch fragmentarily in synchronous condition permitting shifting.

Referring to FIG. 6, a selected number, here three, of the teeth 166 are partially removed for permitting the presence of a blocking ring as hereinafter further described. Such partial removal leaves, however, an axially shortened or partially removed tooth 170 for cooperation with the blocking ring.

Figure 8:
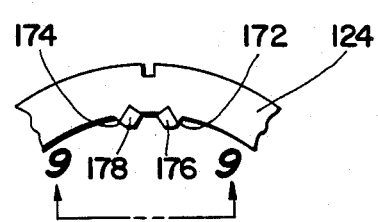
FIG. 8 is a fragmentary view of the blocker of FIG. 6.
Figure 9:
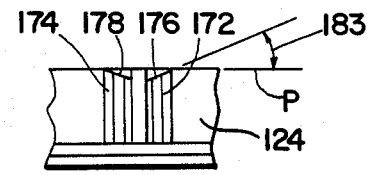
FIG. 9 is a view taken in the direction of the arrows 9—9 in FIG. 8.

Referring now to the relatively nondeformable blockers, which are illustrated in FIGS. 8 and 9, one thereof is indicated generally at 124, and comprises a ring encircling the clutch member 116 and has an appropriate number, here three pairs, of radially inward projections 172 and 174, which when properly positioned will mate with the external teeth above mentioned. The inward projections or teeth 172 and 174 are contoured at their sides to lie snugly against the adjacent ones of the teeth 162, are positioned to project into the spaces between a partially removed tooth 170 and the teeth 162 on each side thereof. Each pair of teeth 172 and 174 are circumferentially of less dimension than the corresponding circumferential spaces defined by partially removing teeth 170 and thus blocker ring 124 may be rotated in either a limited clockwise or counterclockwise direction relative to clutch member 116 from the position seen in FIG. 7 in which the space between teeth 172 and 174 aligns with partially removed tooth 170. Contact of either blocker tooth 172 or 174 by a clutch tooth 162 will limit such relative rotation and cause blocker 124 to rotate with clutch member 116. The space between the inwardly projecting teeth 172 and 174 is, however, of a clearance distance wider than the corresponding circumferential dimension of the tooth 170 so that when properly aligned at synchronism (or more accurately, when the relative speeds of the clutch components cross synchronism) the teeth 172 and 174 will straddle the tooth 170 and the clutch member 116 can move axially through but not past blocker ring 124 to effect engagement with its corresponding gear. As may be seen by reference to 8 and 9, the end faces of the blocker teeth 172 and 174 are tapered as at 176 and 178. The end face of partially removed tooth 170 is also preferably provided with tapers or ramps 180 and 182 complementary with the tapers or ramps 176 and 178 on the blocker ring blocking teeth 172 and 174. The angles 183 of the ramps 176, 178, 180 and 182 is selected such that the blocking teeth and the partially removed teeth will remain in proper blocked position when the main transmission section 12 is engaged, but will tend, under the bias of spring 130 if an auxiliary section shift has been selected, to cause the blocker and clutch to assume a nonblocking position (by causing relative rotational movement of the clutch 116, blocker 124 and/or mainshaft 28) if the main transmission section is disengaged, i.e. in neutral. A ramp angle 183 of about 15°–25°, preferably about 20°, relative to a plane P normal to the axis of rotation of the mainshaft 28 has proven highly satisfactory for most known semi-blocked transmission structures.

As is described in greater detail by reference to U.S. Pat. Nos. 3,921,469 and 3,924,484, the radially inner side of ring 124 may be provided with an inwardly directed groove 184 which receives an annular resilient ring 186 which is normally of slightly less internal diameter than the external diameter of the teeth 162 so that when the parts are in the assembled condition, ring 186 is distorted slightly outwardly thereby to exert a light but definite pressure against the external surface of said teeth 162. Inasmuch as the ring 186 fits loosely and only in light frictional contact with the walls of the groove 184, this effects a significant resistance to axial movement between the blocker ring 124 and the clutch ring 116 but only an insignificant resistance to relative rotative movement therebetween.

A suitable conical surface 188 projects radially outwardly from the blocker ring 124 and is positioned for engagement with a similar conical surface 190 on a radially inner wall of the gear 108. The axial drag above mentioned is sufficient that the rotative driving effect of the surface 190 onto the blocker 124 is much greater than whatever rotative resistance may exist between the blocker 124 and the clutch member 116. A stop ring 192 limits movement of the blocker 124 away from the conical surface 190 when the clutch ring 116 moves out of engagement (leftwardly in FIG. 6).

The operation of the blocker 124 is generally similar to that of known generally nondeformable blockers, and in particular is substantially identical to those nondeformable blockers described in U.S. Pat. No. 3,924,484 and will thus not be described in further detail.

Blocked transmissions, such as auxiliary transmission section 14 described above, utilizing substantially nondeformable blockers which are operable to block or permit a jaw clutch engagement dependent upon the rotative position of the blocker relative to one of the jaw clutch members are a considerable improvement over prior art devices. However, such blocked transmissions have inhererently required auxiliary mechanism and/or operational procedures to achieve satisfactory gear engagement under certain conditions such as rapid unshifting when maximum acceleration of the vehicle is required, upshifting when the vehicle is traveling uphill on a grade and/or when the vehicle is to be shifted from neutral into a drivegear when the vehicle is at rest.

As a blocked or semi-blocked transmission is placed in neutral with the vehicle stopped, motion of the gearing and random frictional contact between the gearing the blockers will usually tend to place the blockers in the upshifting position. Thus, for example, if the gear 108 and mainshaft 28 are rotating in clockwise direction as seen in FIG. 8, blocker ring would be rotated clockwise relative to clutch memberf 116. To achieve a crossing of snychronous, the gear 108, which the blocker ring 124 will tend to rotate with, must be caused to rotate counterclockwise relative to the mainshaft 28. Such a relative rotation will occur only if the mainshaft is rotated faster than the gearing or if the input shaft and gearing is rotated in the reverse (counterclockwise) direction. As, with the main transmission at neutral and/or with the vehicle and engine stopped it is difficult or impossible to rotate the output shaft faster than the input shaft and gearing, without first starting the engine and/or engaging the main transmission section 12 and the master clutch C, a means for allowing shifting of the auxiliary section without these requirements is desirable. The use of the angled ramps 176, 178, 180 and 182 allows such shifting of the auxiliary section under at rest conditions. Briefly, the preselection of an auxiliary gear engagement, with the vehicle at rest, will result in an auxiliary mainshaft gear moving toward its associated clutch collar causing the clutch collar to be axially moved against the bias of its spring 130 or 136. The bias of the compressed spring, acting through the ramps will be sufficient, if the main section 12 is in neutral, to cause or tend to cause the clutch collar and mainshaft to be rotated to a nonblocking position relative to the blocking teeth of the blocker ring. The action of the spring bias on the ramps is not sufficient to cause such relative rotation if the main section is engaged and thus will not hinder the blocking function of the blocker.

It is an important feature of the present invention that the compound transmission 10 utilizes a relatively low inertia mainshaft 28 as compared to many of the prior art compound transmissions. Briefly, the compound transmission 10 may be considered to comprise three separate rotational components, namely an input component, an output component and an intermediate or connecting component. The input component comprises the input or drive gear 22, the main section countershafts 24 and 26, the main section countershaft gears 36, 38, 40, 42 and 44, idler gears 53 and the main section mainshaft gears 46, 48, 50 and 52. The input component is constantly driven by the input shaft 18. The output component comprises the auxiliary mainshaft gears 106, 108 and 110, output gear 112, the auxiliary countershafts 78 and 80 and the auxiliary countrshafts gears 82, 84, 86 and 88. The output component is constantly rotating with output shaft 74. The connecting component comprises mainshaft 28 and the clutch members 56, 58, 60, 114, 116, 118 and 120 splined thereto.

As the mainshaft 28 is not constantly engaged with any gearing, it is of a relatively low inertia which allows for the above-discussed alignment features of the auxiliary section tapered ramps when the main section 12 is in neutral.

Accordingly, should the operator wish to perform an auxiliary section shift with the vehicle at rest, a shift is selected by the master control 154. As soon as torgue is broken, the previously engaged auxiliary mainshaft gear will be disengaged and the selected mainshaft gear moved axially towards its associated clutch ring. The operator then simply utilizes the gear shift lever 72 to place the main transmission section in neutral at which time the auxiliary section shift will be completed. The operator may then move the shift lever into whatever selected position is required to select a desired main section power path or speed.

The shift pattern for the sixteen speed, "4×4" transmission 10 may be seen by reference to FIG. 3. As, in over-the-road conditions, once up to cruising speed (55–60 MPH), the majority of driving is done in the higher speeds, 13th through 16th speeds, only button selected, auxiliary shifts will be required. Such shifts are normally performed by simple throttle manipulations, releasing the throttle to break torque then increasing throttle to cause a crossing (but not a maintaining) of synchronous, without master clutch double clutching, such transmission is extremely easy to operate.

An eight forward speed, "2×4" semi-blocked compound transmission 200 of the splitter type is seen in FIGS. 4 and 5. Transmission 200 comprises a main section 212 having two forward and one reverse speed and an auxiliary section 214 having four selectable speeds or power paths. Auxiliary section 214 is identical, or substantially identical, to auxiliary section 14 described above and will thus not be described in great detail.

Main section 212 includes an input shaft 218 supported by bearing 220, which carries input gear 222, two substantially identical countershafts, 224 and 226, and a floating mainshaft 228. Each countershaft is provided with countershaft gears 236, 238 and 244 fixed thereto. Main section mainshaft gears 246 and 252 surround the inshaft 228 and constantly engaged with and supported by the countershaft gear group 238 and reverse idlers (not shown) engaged with countershaft gears 244.

Sliding clutches 256 and 260, movable by shift forks, 262 and 266, respectively, may be used to clutch reverse gear 252, mainshaft gear 246 or input gear 222 to the mainshaft 228.

Mainshaft 228 extends into the auxiliary section 214 and is generally coaxial with output shaft 274.

With the exception of providing two rather than four main section forward speeds, transmission 210 and its operation are substantially idential to transmission 10 described above.

The shift pattern for transmission 210 may be seen by reference to FIG. 5.

In view of the above, it may be seen that a relatively simple, easily driven compound splitter type transmission is provided. By utilizing blocked clutches in the auxiliary section only, the driver retains the feel of driving an standard manual transmission and is provided with extremely easy to shift auxiliary transmission, which auxiliary transmission can be shifted with the vehicle at rest without requiring clutch and/or throttle manipulation. By providing an easily shifted auxiliary splitter section, a large number of splitter speeds may be provided in an easily shifted transmission.

Although this invention has been described in its preferred form with a certain degree of particularity, it is understood that present disclosure of the preferred form is for descriptive purposes only and that various modifications and changes in the detailed construction and arrangement of the parts may be resorted to without departing from the spirit and the scope of the invention as claimed.

We claim:

1. A compound splitter type vehicular change gear transmission comprising a housing defining a multiple speed main transmission section connected in series with a multiple speed auxiliary transmission section, said transmission including apparatus comprising positive main transmission section clutch means and positive auxiliary transmission section clutch means, said clutch apparatus allowing simultaneous shifting of said main and auxiliary transmission sections under dynamic vehicle conditions without requiring synchronization of said positive auxiliary transmission section clutch means;

said main transmission section comprising an input shaft for driving connection to a prime mover by means of a selectively engaged and disengaged friction coupling and having an input gear rotationally fixed thereto, a mainshaft generally coaxial with said input shaft and extendind into said auxiliary transmission section, at least one countershaft rotationally supported in said housing and driven by said input gear, a plurality of countershaft gears fixed to said countershaft and a plurality of mainshaft gears surrounding said mainshaft and constantly driven by said countershaft gears, said main transmission section clutch means comprising a plurality of positive nonblocked nonsynchronized clutch assemblies rotationally fixed to said mainshaft and to said mainshaft gears for selectively coupling said mainshaft gears one at a time to said mainshaft;

said auxiliary transmission section comprising at least one auxiliary countershaft rotationally supported in said housing, an output shaft generally coaxial with said mainshaft for driving connection to the vehicle drive wheels, said auxiliary countershaft having a plurality of auxiliary countershaft gears fixed thereto, an output gear splined to said output shaft for rotational movement therewith and axial movement relative thereto, said output gear constantly meshed with one of said auxiliary countershaft gears, at least one auxiliary mainshaft gear surrounding said mainshaft for rotational and axial movement relative thereto, said auxiliary mainshaft gear constantly meshed with another of said auxiliary countershaft gears, said auxiliary transmission section clutch means comprising a plurality of blocked resilient jaw clutch assemblies rotationally fixed to said mainshaft for selectively coupling said auxiliary mainshaft gear and said output gear, one at a time, to said mainshaft and auxiliary shifting means for selectively axially moving said auxiliary mainshaft gear and said output gear relative to said mainshaft, said blocked resilient jaw clutch assemblies each comprising a first annular jaw clutch member carrying a first set of clutch teeth fixed to one of said output gears and auxiliary mainshaft gears and a second jaw clutch member carrying a second set of clutch teeth axially engageable with said first set of clutch teeth splined to said mainshaft, said second jaw clutch member resiliently biased towards said first jaw clutch member, a stop means fixedly secured to said mainshaft, spring means normally resiliently urging said second jaw clutch member against said stop means when said one gear is in a first axial position and said first and second sets of clutch teeth are disengaged, a substantially nondeformable bloker ring carried by each of said second positive clutch members for rotation therewith with a predetermined limited relative rotation therebetween, said blocker ring axially movable relative to said second clutch member in at least one axial direction, said blocker ring operable to tend to rotate with said first clutch member at initiation of a clutch engaging operation, said blocker ring and second clutch member each having projections extending therefrom defining an array of interacting projections, said array of interacting projections effective to block relative axial movement of said first clutch member toward said second clutch member if not aligned, said blocker ring having at least one rotational position relative to said second clutch member wherein said array of projections are aligned and at least one rotational position relative to said second clutch member wherein said array of projections are not aligned, said blocker ring effective to sense nonsynchronous rotation of said clutch members corresponding to blocker ring rotation relative to said first clutch member sufficient to cause a non-alignment of said array of projections to block axial engagement of said clutch members, movement of said one gear axially toward said second jaw clutch member causing said array to contact and move said second jaw clutch member axially away from said stop means in opposition to said spring means, whereby said spring means urges said second jaw clutch member to move axially toward said first clutch member to meshingly engage said first and second sets of clutch teeth when substantial speed synchronization is achieved between said first and second clutch member, said arrays having complementary ramps thereon which, under the bias of said spring, will tend to cause said arrays to align when said main transmission section is not engaged, and will not exert a rotational force sufficient to cause said arrays to align when said main transmission section is engaged;

main section shifting means for selectively engaging a selected one of said nonblocked non-synchronized clutch assemblies, said main section shifting means having a selectable position for selecting nonengagement of said main section; and auxiliary shifting means for selectively axially moving said auxiliary mainshaft gear and said output gear relative to said mainshaft, said auxiliary shifting means including preselection means allowing preselection of a selected auxiliary section speed;

said main transmission section normally shifted under dynamic vehicle conditions in the sequence comprising disengaging said friction coupling, shifting from an engaded main transmission section speed into said nonengagement position, re-engaging said friction coupling to cause the clutch members of the main section clutch assembly to be engaged to rotate substantially synchronously, disengaging said friction coupling and then causing said main section clutch assembly to be engaged to move into engaged position whereby if an auxiliary transmission section speed has been preselected prior to a main transmission section shift, during a main transmission section shift auxiliary transmission section will shift into said preselected speed during said main transmission section shifting sequence without requiring said preselected auxiliary transmission section clutch members to achieve substantially synchronous rotation.

2. The transmission of claim 1, wherein said ramps define an angle of 15°–25° with respect to a plane normal to the axis of said mainshaft.

3. The transmission of claim 1, wherein said ramps define an angle of about 20° with respect to a plane normal to the axis of said mainshaft.

4. The transmission of claim 2, wherein said transmission is defined by the relationships $$A \times B = C$$

and

B is greater than or equal to A, wherein:
A = the total number of main transmission forward gear ratios,
B = the total number of auxiliary section gear ratios,
C = the total number of transmission selectable forward gear ratios.

5. A splitter type compound vehicular transmission comprising:

an input component comprising an input shaft for driving connection to a prime mover by means of a selectably engagable and disengagable friction coupling, an input gear rotationally fixed to said input shaft, at least one first countershaft carrying a plurality of first countershaft gears constantly meshed with said input gear and a plurality of first mainshaft gears constantly meshed with other of said first countershaft gears;

a connecting component comprising a mainshaft and a plurality of first and second mainshaft clutch members rotationally fixed to said mainshaft, said connecting component independently rotatable of said input component; and an output component comprising an output shaft, an output gear rotationally fixed to said output shaft, at least one second countershaft carrying a plurality of second countershaft gears thereon, one of said second countershaft gears constantly meshed with said output gear and at least one second mainshaft gear constantly meshed with another of said second countershaft gears, said output component independently rotatable of said connecting component, said input gear and first manishaft gears selectively clutchable one at a time to said mainshaft by first nonblocked nonsynchronized clutch means including said first clutch members, said output gear and second mainshaft gear selectively clutchable one at a time to said mainshaft by second blocked clutch means including blocking members and said second clutch members, said blocking members adapted to continute to block engagement of said second clutch means only if any one of said first clutch means is engaged and the one of said output gear and second mainshaft gear being clutch to said mainshaft by said second clutch means is not rotating substantially synchronously with said mainshaft, under dynamic vehicle conditions, the currently engaged first clutch means is disengage and a desired first clutch means is engaged in a sequence including a step of simultaneously placing and maintaining all of said first clutch means in a disengaged condition whereby, during dynamic vehicle conditions, a selected second cluth means may be engaged without requiring synchronous rotation thereof during a change in th e engaged one of the first clutch means.

6. The transmission of claim 5, wherein at least two substantially identical first countershafts and at least two substantially identical second countershafts are provided and said mainshaft gears surround said mainshaft and are supported by the countershaft gears constantly meshed therewith.

7. The transmission of claim 1 wherein said main section shifting means comprises a lever movable to a unique position to select each main section selectable speed and disengagement of said main section, said main transmission section nonsynchronized nonblocked jaw clutches are controlled by shift forks fixed to a shift bar housing assembly and said means for axially moving said auxiliary mainshaft gear and output: gear comprises at least one shift fork attached to a remote servo mechnism.

* * * * *